INVENTOR.
LEO G. CLARK
BY James P. Malone 3,279,380
DETECTOR AND REGULATOR OF WATER IN
FUEL STORAGE TANKS
Leo G. Clark, 10 E. Beach Promenade, Lindenhurst, N.Y.
Filed June 21, 1963, Ser. No. 289,607
6 Claims. (Cl. 103—26)

This invention relates to a means of detecting and regulating water accumulation in gasoline storage tanks.

More particularly it pertains to a combined device to detect, locate and regulate water, such as condensation, which tends to collect and accumulate in tanks like those used in commercial gasoline service stations and central distributing depots. The said regulation, i.e. removal, may be accomplished either by completely automatic or by manual means by the provision of a selective device.

One of the most serious problems in the wholesale distribution and retail selling of fuel oils, such as gasoline and the like, is the constant presence of water in nearly all gasoline kept in storage tanks. The presence of water is caused by many reasons, one of the main ones being natural formation of condensation; another is leakage; still another is accidental delivery of water from trucks into storage tanks, such tanks generally located underground. However it enters the tank, water being heavier than fuel gradually settles to the bottom. After a period of time, the length of which is dependent upon the rate of leakage or speed of condensation, the water builds up to an increasingly greater level causing it to be pumped out with the gasoline.

Well known in the industry to which this invention relates, contamination by water is one of the foremost causes of trouble in any type of fuel-oil combustion engines. The present embodiment described herein, although pertaining more particularly to those engines using gasoline, is not to be construed as being limited to that use only.

Water-contaminated gasoline damages automobile engines in innumerable ways and has been the basis for harassment by court proceedings for amounts exceeding just damage repair (i.e., new automobiles, etc.). Water in gasoline-powered engines also causes freeze-ups, not limited to winter weather, but occurring during warmer weather, as well and has been the cause of serious accidents on the highways caused by sudden stalling, etc. It is obvious that the costs in this area alone run into millions of dollars annually.

The costs are even greater for new service equipment because modern type delivery pumps are constructed with intricate type computing systems and are fitted with special leather protectors, gaskets and liners resistant to gasoline but not to water. Hence, water-contaminated gasoline not only freezes up lines, hoses and short-circuits electricity but also damages pump interior and fittings to a condition beyond repair and must be replaced. Methods in present use to cope with this problem are antiquated, unfeasible, uncertain and often dangerous.

The present invention solves this problem in a novel, simple, safe and inexpensive manner. The embodiment herein described generally comprises a suction pipe extending down from upper part of tank to a point adjacent to the bottom of the tank. A pump, positioned remotely from the tank unit, is activated by a specially devised electrical switching means. Said switching means is actuated by a float, pivotally mounted adjacent to the tank bottom. A perpendicularly movable shaft having a ball point end rests proximally on a grooved tray attached to the float. Said float is set by the addition or the subtraction of extra weight to react to the slightest increase of water level pressure build up from a level which is predetermined as "safe."

When the float rises, for instance, about one-quarter of an inch, due to increasing water level pressure, the aforementioned movable shaft rides up through a metal sleeve and a slight impulse upward actuates switching means located above the tank and also below the ground level in an explosion proof box, by use of a special abutment plate. The switching means is held in "on" position until operations of detection and regulation, i.e. warning system and elimination of water thereof, have been completed.

When the switch is in "on" position, a system warns the operator that water has reached dangerous level and at the same time gives said operator exact location of affected tank.

A central terminal board or panel box is provided having selective means for the operator to allow pumping means to be activated automatically or he may switch over to manual pumping means, wherein the regulation may be observed and watched for any reason whatsoever.

When water has fallen to a level within the tank predetermined to be "safe" the pump is shut off. The float descends as water level pressure decreases, the aforementioned movable shaft rides down, the top end of the movable shaft causes deactivation of the switching means from "on" position to "off" position by breaking the switch contact, thereby shutting off the entire water detector-eliminator system automatically, and it will remain so until such time as water again rises to a level predetermined as dangerous.

A major problem in designing the present invention was to devise apparatus of strictest simplicity which can be inserted through conventional bung holes, which could be from two inches to four inches in diameter, in existing tanks, usually positioned underground for safety.

Another problem was to place the switching means well outside the tank area, yet not above ground level where electric current might create a hazard if volatile fumes were to come into contact with sparks. As the drawings will show, the switching has been placed inside an explosion-proof box well above the tank and is buried one to two feet below the concrete ground level. Admission for repair or adjustment may be had through an aperture covered by a manhole plate and secured by special locking device.

Still another problem was to provide a simplified and novel method of adjusting the weight affecting said float so that, once set into tank, it could be kept operable at the water pressure level predetermined as being dangerous. A movable shaft is set down into the tank through a metal sleeve and with which it does not come into contact at any point due to specially devised bushings welded inside sleeve, and moves freely through the sleeve. The movable shaft being a part of the total weight itself has a hollow center, approximately the diameter of a large size buckshot, admitting as many buckshot pellets as necessary to attain a fine weight adjustment thereto through an opening in top. These tiny weights make for accuracy, especially since the predetermined weight needed in a given tank rarely changes.

An added feature of this method of weight adjustment is that in the event a change of weight is necessary the hollow shaft can be pulled up and removed and another one put down in its place.

Yet another problem of this invention was the necessity to devise means for the integration of detection systems including a means to warn operator that water has reached a danger level inside the tank and to positively locate the affected tank. From this it can be understood that said detection system indicator must be positioned in an area within constant view or hearing, or both, of the operator and that such a system have the added feature of providing a method of selective control whereby said operator has the choice of permitting regulation i.e., water elimination by pump-out, to work by completely automatic or manual means or both.

A modification provides means allowing operator full view of the pump-out action at time of occurrence and further provides means for the operator to have full access to, and control of, shut-off switches such as safety and counter-safety measures.

Accordingly, a principal object of this invention is to provide new and improved practical means for the detection and regulation of liquid in fluid storage tanks.

Another object of the invention is to provide new and improved practical means for automatically detecting therein a rise in water pressure in any given tank to a level predetermiend to be dangerous.

Another object of the invention is to provide new and improved practical means for the exact locating of a tank so affected with water.

Another object of the invention is to provide new and improved practical means for removal of water accumulation through the choice of the operator to select fully automatic means, manual means, or both.

Another object of the invention is to provide new and improved practical means to prevent contamination of gasoline by water.

Another object of the invention is to provide new and improved practical means to prevent unnecessary water damage to any kind of motor, engine or power plant driven by such volatile fluid as fuel oil, gasoline, etc.

Another object of the invention is to provide new and improved practical means to protect costly and expensive machinery inside delivery pumps, such as feed pipe lines, and leather fittings, where such may be destroyed by either water or ice caused by freeze-ups.

Another object of the invention is to provide new and improved practical means of detection and regulation of water in new or preexisting tanks, such as those buried underground in gasoline service stations and adapted to be inserted also in any other type fuel oil storage tank, such as those above ground at storage depots, at bulk plants, those at distributing centers and wherein the invention may be modified to be used on ocean tankers, rail tank cars or delivery tank trucks.

These and other objects of the invention will be apparent from the following specification and drawings of which:

Figure 1:
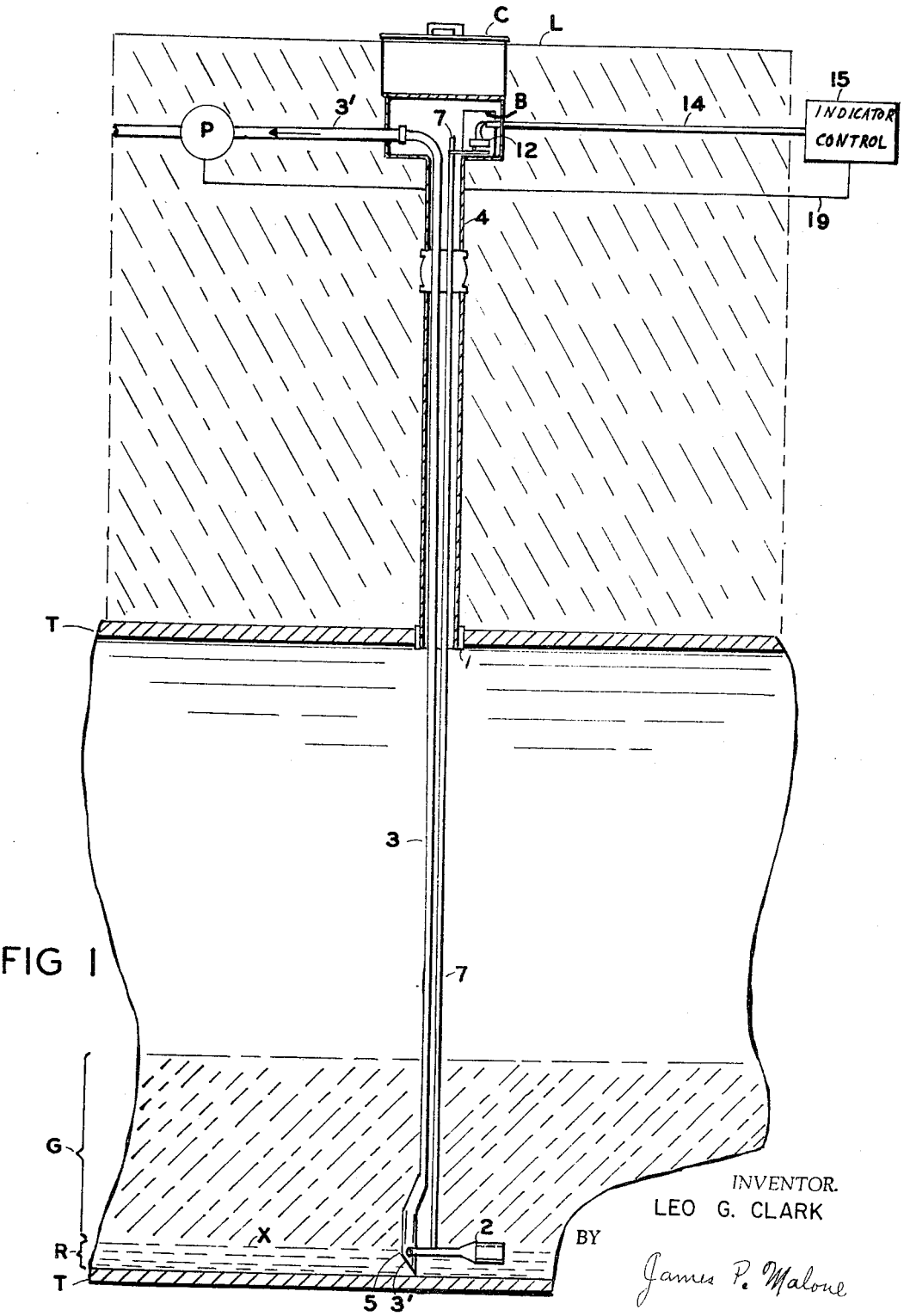
FIGURE 1 is a side view partly in section showing an embodiment of the invention.

Referring to the drawing FIGURE 1, there is shown a sectional view of a typical gasoline tank T which is vented and is mounted several feet under ground level L in a typical service station installation. These tanks are generally about six feet in diameter and have an existing bung hole opening 1 for pipe connections. This opening may be used for the installation of the present apparatus. The gasoline G is on top of water R since it has less specific gravity. Use of a specially adapted float 2 made reactive to water pressure increase as little as one-quarter inch rise in level makes it possible to keep the accumulated water level down to a predetermined amount by eliminating the water from the tank before it can be dispensed out through delivery route of the gasoline.

A suction pipe 3 extends through an outer casing 4 to a point adjacent to the bottom of the tank and may rest thereon provided there is a suction aperture. The suction pipe may be cut at an angle shown at 3'. Float 2 is pivotally mounted on the suction pipe for instance, by a pin 5 and connecting member 6 which may be a grooved tray. A typical float 2 might be of cylindrically shaped metal and about five inches long and two and three-quarter inches in diameter. A hollow rod 7 extends from the top of the apparatus, well above the tank, preferably through a sleeve 9 (FIGURE 3) which has specially constructed bushings 8, 8', set inside at top and bottom so that hollow rod 7 may ride freely in groove 6' of tray 6 and so that rod 7 responds to upward urge without danger of hang-up or resistance thereto.

More specifically the casing 4 is screwed into the threaded aperture 1 in the tank. The explosion proof box B is connected to the casing 4 and is set in a well several feet below the ground level L. The well is preferably covered with a cover C. Inside the box B is mounted a switch 12 which is adapted to be activated by the rod 7, as will be explained. The switch is connected via cable 14 to a control indicator 15 which is connected by the cable 19 to pump P. The pump P is connected to the suction line 3–3'.

The float 2 is pivotally mounted on the suction pipe 3 so that the entire assembly may be inserted through the preexisting aperture 1 of the tank.

Means are provided for adjusting the weight on the rod 7 so that at the predetermined water level X, switch 12 will be activated which provides a warning on the indicator control 15. The indicator control 15 is preferably arranged so that pump P may be activated automatically or manually by the operator. The control indicator 15 may control various conventional warning devices such as lights, bells, or buzzers for a plurality of different tanks.

Figure 2:
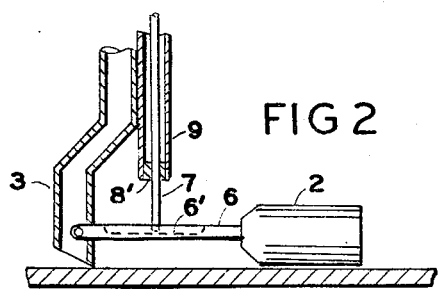
FIGURE 2 is an enlarged detail sectional view of the components of FIGURE 1 located at the tank bottom showing the main actuating elements of the apparatus.

Referring to FIGURE 2 the rod 7 is preferably mounted in a separate sleeve 9 which has bushings 8 and 8' which center the rod. The rod 7 preferably has a round lower end which fits into a groove 6' in the connecting member 6.

The rod 7 may be hollow so that it may be loaded with buckshot W for fine weight adjustment purposes. If desired, additional weights W' may be added to the top of the rod.

Figure 3:
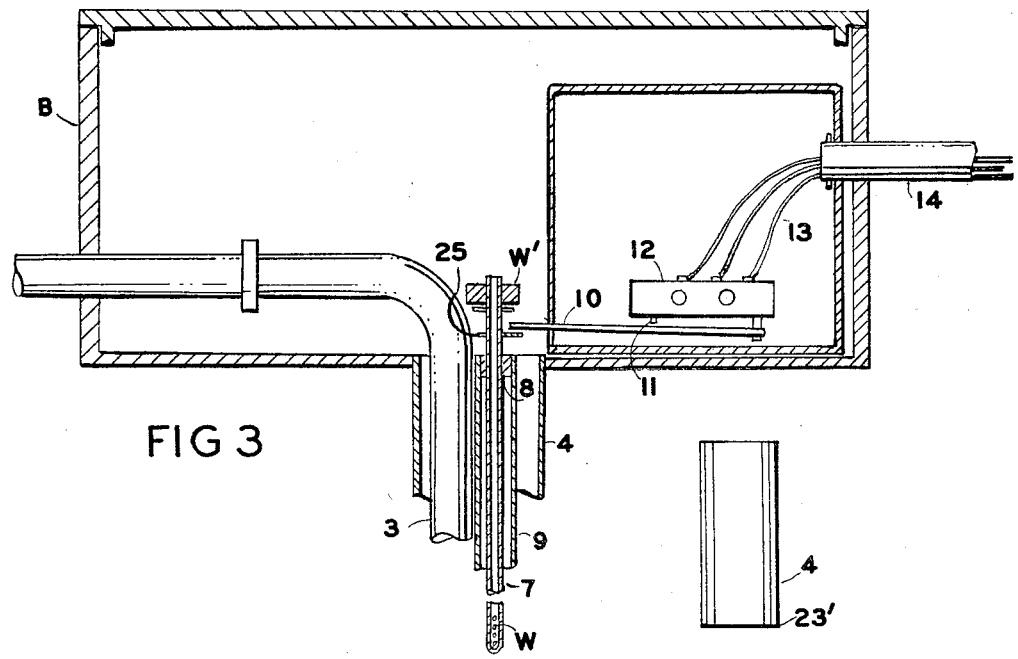
FIGURE 3 is an enlarged detail sectional view of the components located above the tank and set in the earth approximately one foot from the ground surface.

Referring to FIGURE 3 which shows the upper components, at the top of the hollow rod 7 is a special collar-like device 25 which is fitted into a single groove on exterior of hollow rod 7. Making contact with collar device 25 but not rigidly connected thereto, is seen spring abutment plate 10 which makes contact with pin 11 of switching means 12. When float 2 is urged upward for instance, not more than one quarter inch, the contact pin 11 is held in "on" position causing electric current to go through connecting wires 13 and on through heavy cable 14 outlet to a control indicator panel 15 seen as FIGURE 5, placed remotely from the tank, but within view and/or hearing of operator.

The indicator control box 15 is part of the embodiment referred to as the detection means. Some kind of detector is absolutely necessary when an apparatus is constructed to have any kind of action in an area containing certain volatile fumes.

Figure 5:
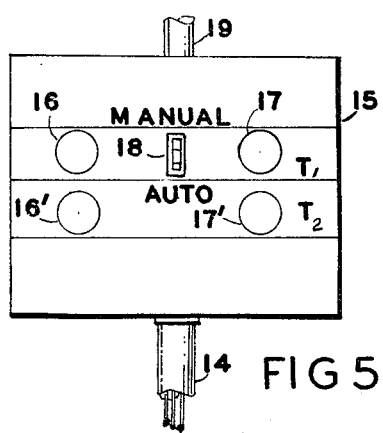
FIGURE 5 is a view of indicator and control means for the invention.

Referring now to FIGURE 5, a cable 14 carries electric current from the switching means 12 contained in explosion proof box B set in the ground, which is seen in FIGURE 3, to the terminal box 15 generally positioned in view of the operator, in the service station enclosure itself for instance. Light bulbs 16, 16' for tanks T1, T2, etc., or any other like warning devices which could be either visual or audio would indicate that the apparatus is on. They could be of any color desired, such as green, for example. However, when the water level rises in any given tank, T1, T2, etc., a green light 16, 16' would go out and immediately the other light bulbs 17 and 17' which could be red, flashes "on," warning the operator that elimination of water will proceed automatically unless for any reason whatsoever he desires manual procedure. Then he may, at his own choice, make use of switch 18 selectively cutting out automatic action and cutting in manual action by stopping current from passing up and out through terminal box outlet cable 19. Cable 19 makes connection with the pump P component which may be conventional.

Figure 4:
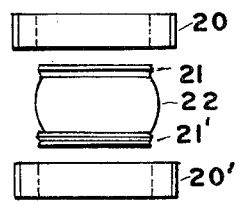
FIGURE 4 is an enlarged exploded view in elevation of the pipe unit inserted into the tank bung hole.

Referring to FIGURE 4 the drawing shows an elevation view of casing 4 and 4' and location of its insertion in tank T bung hole 1. The drawing shows further in an exploded view "a threadless connector" to illustrate the ease and simplicity of installing the entire unit which would be encased inside it. Large nuts 20 and 20' have interior threads to be fitted by the reverse threads 21 and 21' of member 22. The barrel-like bulge of member 22 has action similar to a lock or pressure nut device, thus enabling the threadless ends 23 and 23' to be fitted tightly and securely, yet simply and easily by giving it a reverse twist.

In order to adjust the float properly so that it will operate the rod on switch at a predetermined water level, the float may be weighted by adding buckshot W or weights W' at the top of the rod. In other words, the weights are chosen so that when the water level rises above the line X then the switch will operate the pump to reduce the water level. The level may be any predetermined amount but is preferably at not more than two or three inches of water. Since the gasoline is pumped from a point in the tank considerably above this, there will be no danger of contamination.

Note that there is no electrical apparatus inside in the tank, for the reason that sparks from the switch or other electrical apparatus might ignite gasoline fumes. The pump might be a sealed unit member for safety.

Note that the apparatus is constructed so that the entire installation may be made by inserting it through the six inch bung hole 1. In order to do this, the float is pivoted down so it is almost axial with the suction pipe 3 and the suction pipe, rod and casing are then inserted in the tank. The casing 4 is then secured to the tank by means of the threaded fitting.

The apparatus is then adjusted by adding the weights W and W' so that the water level would be controlled to a predetermined level as desired. This adjustment may be checked by inserting a stick gauge in the tank.

Many modifications may be made by those who desire to practice the invention without departing from the scope thereof which is defined by the following claims.

I claim:
1. Water control means for a gasoline tank comprising;
   a suction pipe extending from the upper part of said tank to a point adjacent the bottom of said tank,
   a float pivotally mounted on said suction pipe adjacent the bottom of said tank,
   a rod extending from the top of said tank, the bottom of said rod resting on said float,
   a pump connected to said suction pipe,
   a switch connected to operate said pump,
   said rod being adapted to operate said switch and means to adjust said float so that said float and rod activate said switch and pump only when there is more than a predetermined amount of water in the bottom of said tank.

2. Water control means for a gasoline tank comprising;
   a suction pipe extending from the upper part of said tank to a point adjacent the bottom of said tank,
   a float pivotally mounted on said suction pipe adjacent the bottom of said tank,
   a rod extending from the top of said tank, the bottom of said rod resting on said float,
   a pump connected to said suction pipe,
   a switch connected to operate said pump,
   said rod being adapted to operate said switch,
   means to adjust said float so that said float and rod activate said switch and pump only when there is more than a predetermined amount of water in the bottom of said tank,
   a casing pipe adapted to contain said rod and said suction pipe said casing pipe being adapted to be screw connected to said tank.

3. Water control means for a gasoline tank comprising;
   a suction pipe extending from the upper part of said tank to a point adjacent the bottom of said tank,
   a float pivotally mounted on said suction pipe adjacent the bottom of said tank,
   a rod extending from the top of said tank, the bottom of said rod resting on said float,
   a pump connected to said suction pipe,
   a switch connected to operate said pump,
   said rod being adapted to operate said switch and means to adjust said float so that said float and rod operate said switch and pump only when there is more than a predetermined amount of water in the bottom of said tank,
   said float, rod and suction pipe being adapted to be inserted through a conventional bung hole in the top of said tank.

4. Fluid level means for a tank containing a light fluid and a heavy fluid comprising;
   a suction pipe extending from the upper part of said tank to a point adjacent the bottom of said tank,
   a float pivotally mounted on said suction pipe adjacent the bottom of said tank,
   a rod extending from the top of said tank, the bottom of said rod resting on said float,
   a pump connected to said suction pipe,
   a switch connected to operate said pump,
   said rod being adapted to operate said switch and means to adjust said float so that said float and rod operate said switch and pump only when there is more than a predetermined amount of said heavy fluid in the bottom of said tank.

5. In a gasoline tank of the type having an aperture approximately six inches in diameter, water control means adapted to be inserted through said aperture comprising:
   a suction pipe extending from the upper part of said tank to a point adjacent the bottom of said tank,
   a float pivotally mounted on said suction pipe adjacent the bottom of said tank,
   a rod extending from the top of said tank, the bottom of said rod resting on said float,
   a pump connected to said suction pipe,
   a switch connected to operate said pump,
   said rod being adapted to operate said switch and means to adjust said float so that said float and rod operate said switch and pump only when there is more than a predetermined amount of water in the bottom of said tank.

6. Fluid level means for a tank containing a light fluid and a heavy fluid comprising;
   a pipe extending from the upper part of said tank to a point adjacent the bottom of said tank,
   a float pivotally mounted on said pipe adjacent the bottom of said tank,
   means connected in said tank to expel said heavy fluid from the bottom of said tank, switch means connected to operate said expelling means, said float being adapted to actuate said switch, said float being adapted to rotate sufficiently with respect to said pipe to permit the insertion of said pipe and float assembly through a narrow aperture without emptying said tank, said float being adapted to assume its normal operating position, adjacent the bottom of said tank.

References Cited by the Examiner
UNITED STATES PATENTS

| | | | |
|---|---|---|---|
| 1,694,199 | 12/1928 | Gross | 103—26 |
| 1,760,382 | 5/1930 | Teesdale | 103—26 |
| 2,375,428 | 5/1945 | Marsh | 222—63 |
| 2,927,174 | 3/1960 | Walshin | 103—26 |

LAURENCE V. EFNER, *Primary Examiner.*